(No Model.)
J. H. DALES.
SPRING.
No. 508,288. Patented Nov. 7, 1893.
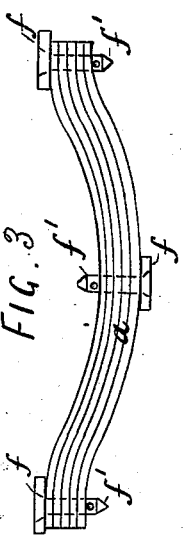
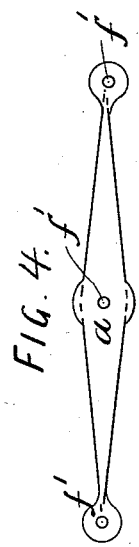
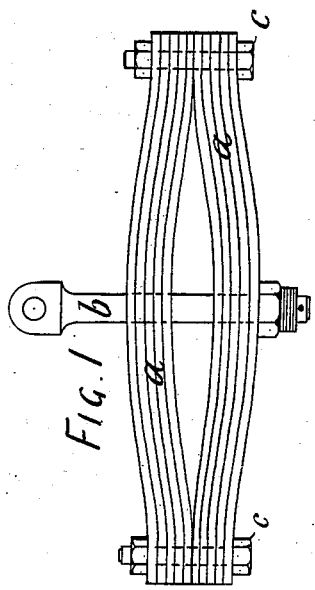
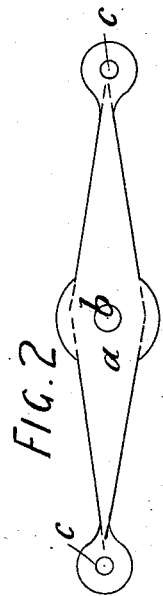
Witnesses
J. A. Saul.
G. W. Rea.
Inventor
John Handsley Dales
by James L. Norris
Atty.

UNITED STATES PATENT OFFICE.

JOHN HANDSLEY DALES, OF LEEDS, ENGLAND.

SPRING.

SPECIFICATION forming part of Letters Patent No. 508,288, dated November 7, 1893.

Application filed June 15, 1893. Serial No. 477,705. (No model.) Patented in England April 22, 1892, No. 7,630.

*To all whom it may concern:*

Be it known that I, JOHN HANDSLEY DALES, civil engineer, a subject of the Queen of Great Britain, residing at 45 Lofthouse Place, Leeds, in the county of York, England, have invented a new and useful improved form of laminated plate-spring and spring-plate for the road-wheels and frames of locomotive-engines, railroad and common-road vehicles, and for other purposes, (for which I have obtained a patent in Great Britain, No. 7,630, bearing date April 22, 1892,) of which the following is a specification.

The invention consists of making the plates of laminated plate springs of the form on plan of a true cantalever of uniform depth, that is to say, of the form of a single or double isosceles triangle, the base or bases of which coincides with the root or bearing part of the spring, and the apex or apices, with the bearing points of the load or the reverse, according to the mounting of the spring, said apices being formed into loops for the reception of safety-bolts by which the leaves of the laminated spring may be prevented from falling asunder should the spring, or any one or more of its leaves, be fractured.

In carrying out my invention, by preference I make the said plates with a hole in about the center of the length and width of the same, for the purpose of threading the plates onto a pin, stud or bolt, for holding the plates together in working position, and I carry the metal round the said holes to maintain the proportionate areas of the section according to those of a cantalever aforesaid. The apices of the triangles I form into a loop or bolt hole for the reception of a bolt or equivalent provision for preventing the plates from falling asunder in case of fracture of any of them.

All the plates of a spring formed according to the invention are of the same size and shape and any required strength of spring may be obtained by simply piling any sufficient number of plates of the same size.

Referring to the accompanying sheet of drawings, Figures 1 and 2 are side elevation and plan respectively of a locomotive driving axle spring formed according to the invention, in which $a\ a$ are two sets of plates forming together an elliptical spring, the bolt $b$ in the center carrying the load on the spring, which load causes the spring to collapse. The bolts $c\ c$ are for the purpose of fastening the ends of the plates together and preventing them from falling asunder in case of the breakage of any of them.

Figs. 3 and 4 are the side elevation and plan respectively of a common railway wagon spring according to the invention. The plates $f\ f\ f$ are for taking the bearings off the spring, the pins $f'\ f'\ f'$ being for the same purpose of holding the plates together as the bolts in Figs. 1 and 2.

All the letters refer to the same parts in the different views and figures.

The cantalever spring plates are shown by $a$ in all the views.

I claim—

A spring consisting of diamond-shaped, laminated plates of metal of uniform thickness, but having uniform diminution in width from the central portions toward the ends, or apices, the latter being provided with loops for the reception of safety-bolts, substantially as described.

Dated this 27th day of March, 1893.

JOHN HANDSLEY DALES.

Witnesses:
CHARLES H. NAYLOR,
*Drighlington.*
HENRY DENTON,
*Evering Rd., Clapton, London.*